July 31, 1951   S. S. ADAMS   2,562,685
THERMOSTATIC SNAP-ACTION ELEMENT
Filed June 4, 1949
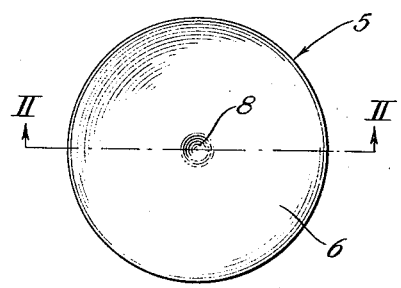
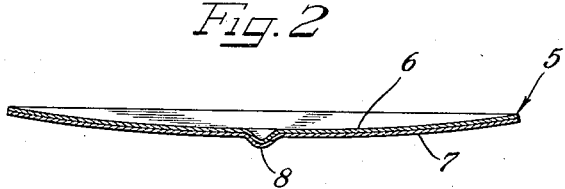
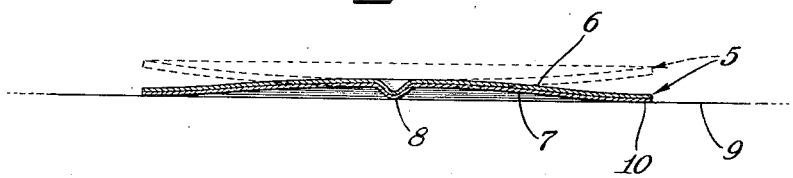
Inventor
Soren S. Adams
by The Firm of Charles W. Hill Attys Patented July 31, 1951

2,562,685

UNITED STATES PATENT OFFICE 2,562,685

THERMOSTATIC SNAP-ACTION ELEMENT

Soren S. Adams, Asbury Park, N. J.

Application June 4, 1949, Serial No. 97,105

1 Claim. (Cl. 297—15)

This invention relates to improvements in a thermostatic snap-action element, highly desirable for use as a novelty or trick device, although the invention will have other uses and purposes as will be apparent to one skilled in the art.

In the past, devices of this character have been made in the form of a concavo-convex disk and utilized for novelty or trick entertainment purposes, as well as in mechanical apparatus as a snap-acting control element or the like. These devices, however, except for the concavo-convex shape had smooth even surfaces. When heat is applied to the convex side of the device, it may be distorted by indenting the convex side of the device, and when it cools, the device will assume its original concavo-convex position with a snap-action. Thus, if the device is placed upon a cool surface such as a table top in its distorted position, it will jump in the air when it suddenly assumes its original shape. Likewise, if the device is held in position around the edge, it would assume original shape with a snap-action, the center part of the device moving a noticeable distance, and thus it might be used to control a mechanical part such as a switch. Devices of this character heretofore known, did not have a desirable amount of force or positive pressure upon the snap-action movement to original shape.

With the foregoing in mind, it is an important object of the instant invention to provide a thermostatic element capable when heated of assuming a distorted shape, and capable of resuming its original shape with a positive forceful snap-action upon a predetermined drop in temperature.

Another object of this invention is the provision of a thermostatic device of the character set forth herein, having a normal concavo-convex shape and capable when heated of assuming a temporary shape with the convex side centrally indented; the device being such that when disposed adjacent a flat surface in its deformed position, there will be rim contact as well as intermediate contact with that surface so that when the device suddenly assumes its normal or initial position, the rim may leave the surface but the intermediate contact will provide a positive pressure against the surface.

It is a further feature of this invention to provide a simple concavo-convex thermostatic element capable of temporarily holding a distorted shape when heated, but which when the temperature drops suddenly assumes its normal position with a snap-action and with positive pressure against any surface in contact with it.

Still a further object of this invention resides in the provision of a thermostatic element in the form of a concavo-convex disk having an intermediate projection bulging outwardly from the convex side.

It is also a feature of this invention to provide a thermostatic concavo-convex disk-like device which may be given a distorted shape when heated, and which upon cooling suddenly assumes its original shape with a snap-action, the device being so constructed that when placed upon a flat surface it will jump in the air upon cooling to a distance far greater than devices of this character heretofore known.

While some of the more salient features, characteristics and advantages of the instant invention have been above pointed out, others will become apparent from the following disclosures, taken in conjunction with the accompanying drawing, in which—

Figure 1 is a plan view of a thermostatic element or device embodying principles of the instant invention, looking at the concave side of the device;

Figure 2 is an enlarged central vertical section through the device of Fig. 1, taken substantially as indicated by the line II—II of Fig. 1, looking in the direction of the arrows; and Figure 3 is a view similar in character and location to Fig. 2, but showing the device in its temporary distorted position, and indicating the action of the device in dotted lines.

As shown on the drawings:

In the illustrated embodiment of this invention, there is shown a thermostatic disk, generally indicated by numeral 5, of concavo-convex shape. As seen better in Figs. 2 and 3, the thermostatic element 5 is preferably bi-metallic in character, consisting of two laminations 6 and 7 each of a different metal and having different coefficients of expension. A projection 8, which may satisfactorily have the shape of a rounded knob as illustrated, is provided to extend from the convex side of the device or disk, and this projection may be provided satisfactorily in a simple stamping operation, causing an indentation in the concave side of the disk as seen clearly in Figs. 2 and 3. Preferably, the projection or hump 8 is centrally disposed.

For purposes of clarity, the operation of the device will be described herein with the device being used as a novelty for entertainment purposes. The disk may be grasped between the fingers and thumb, rubbed briskly with the thumb on the convex side, or else rubbed against the apparel of the user, so as to heat the device and especially the lamination 7 thereof to a moderate extent. Either before or after such heating the convex side may be pressed inwardly in the center region thereof so the device will have the general configuration illustrated in Fig. 3. That configuration or deformation of the disk will automatically be retained until the disk has lost the added temperature applied by the rubbing operation. The disk will then suddenly assume its normal or original shape indicated by the dotted lines in Fig. 3, with a decided and positive snap-action.

This sudden resumption of original shape will cause the disk to leap or jump a relatively considerable height in the air, if it has been placed on a flat surface such as a table top.

It will be noted that after the disk has been heated by friction or otherwise to a moderate degree, the convex side centrally indented, the disk may be laid with the normally concave side uppermost on a flat surface indicated by the line 9 in Fig. 3. When placed in this position, it will be noted that the marginal portion of the disk is in contact with the surface as indicated as 10, while the projection or hump 8 is also in contact with the surface, that annular part of the disk between the hump and the marginal portion being elevated from the surface. In disks of this character heretofore known, made without the projection or hump 8, obviously there would only be an annular marginal contact with the surface when the disk was in its distorted shape. Consequently, when the disk suddenly assumed its original shape, the center portion of the disk would contact the surface with a smart impact like that of a sudden blow, and the disk would in effect bounce a certain extent in the air. With the instant invention, however, there is always positive contact with the surface, and when the disk suddenly assumes its dotted line position, there is a positive pressure namely at the projection 8 acting against the surface, and the disk will leap or jump into the air at least double the distance of such devices heretofore known. Obviously the extra high leap adds considerably to the attractiveness and entertaining value of the device. Obviously, also, should the disk be used in some other locale for a different purpose, the greatly enhanced pressure exerted by the disk would increase its value.

From the foregoing, it is obvious that I have provided a simple form of snap-acting thermostatic device embodying a structure by which the device is enabled to impart a considerable force. The change in construction over devices of this character heretofore known is such as to add only a negligible amount to the cost of production of the device. The device is obviously economical, and highly durable.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A thermostatic device comprising a circular disk having a concavo-convex configuration, said disk consisting of bi-metallic laminae coextensively integrated throughout the entire dimension of said disk, said disk being flexibly distortable to form a circular convexo-concave projection extending from the normally concave face of said disk and being surrounded by a substantial annular margin adjacent the periphery of said disk, said margin retaining the original configuration curvature of said disk, said disk being locked in its distorted condition above a predetermined temperature and released therefrom below said temperature, said disk having a projection extending from the normally convex face of said disk and together with said annular margin adapted to engage a supporting surface when said disk is flexibly distorted.

SOREN S. ADAMS.

REFERENCES CITED

The following references are of record in the file of this patent:

UNITED STATES PATENTS

| Number | Name | Date |
| --- | --- | --- |
| 1,962,927 | De Bats | June 12, 1934 |